June 27, 1933.  E. E. DREESE  1,915,778
DYNAMO ELECTRIC MACHINE
Filed Sept. 5, 1930
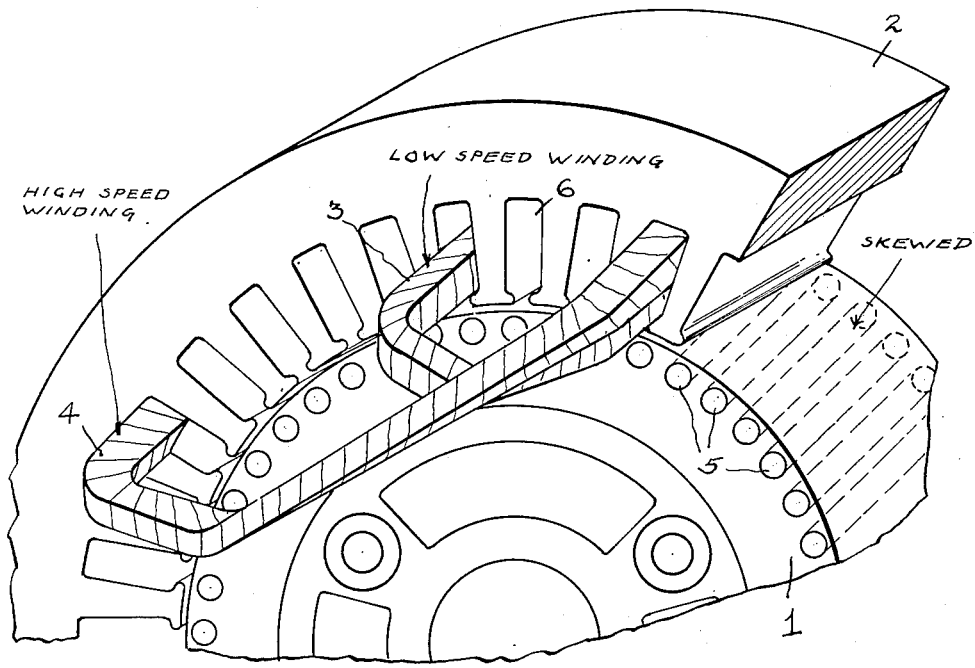
INVENTOR.
Erwin E. Dreese
BY
Fay, Oberlin & Fay
ATTORNEYS.

Patented June 27, 1933

1,915,778

UNITED STATES PATENT OFFICE

ERWIN E. DREESE, OF WORTHINGTON, OHIO, ASSIGNOR TO THE LINCOLN ELECTRIC COMPANY, OF CLEVELAND, OHIO, A CORPORATION OF OHIO

DYNAMO ELECTRIC MACHINE

Application filed September 5, 1930. Serial No. 480,023.

This invention relating, as indicated, to dynamo electric machines has specific reference to the construction of induction motors and more particularly to a form of construction in which the torque characteristic of such motors may be accurately controlled.

In the construction of motors of the above class, especially low speed motors, and more particularly in the larger sizes of such motors, the desired torque cannot be obtained accurately in the particular machine by means of the ordinary manufacturing variables such as the variation in the number of stator conductors, the number, size, and length of the rotor rods, etc. For a number of purposes for which motors are designed, it becomes extremely important that the torque of the motor be within relatively narrow limits of certain values in order that the motor may be employed at all. A specific example of such a case wherein the torque of the motor must be within relatively narrow limits of certain values is in the design and construction of a motor for the purpose of driving an elevator or other like apparatus.

It is evident that the torque of the motor, both high and low speed, to be employed satisfactorily for the operation of an elevator must bear a specific relation to the mass of the moving carriage and the load which it is designed to carry, so that an accurate control of the current supplied to the motor will result in a smooth operation of the elevator apparatus. If the motor torque is not related in the proper manner to the mass of the carriage and the load it is to carry, the motor will cause a jerky operation of the carriage which is highly undesirable in the operation of such apparatus. It becomes necessary, therefore, to provide a means for controlling the torque of a motor, which method shall enable a motor to be manufactured within the prescribed torque ranges and at a cost lower than that by which such torque control is possible with manufacturing schemes such as are now employed.

My invention is particularly applicable to multiple speed motors inasmuch as the same can be employed to effect a change in the torque at one speed without materially affecting the torque at other speeds should such control of the torque be desirable. In single speed motors a number of ways may be employed for the purpose of varying or changing the torque of the motor so that such torque may relate specifically to the requirements of the installation for which such motor was designed. A very obvious manner in which the torque of a single speed motor may be controlled is to insert a resistance in series with the motor which will reduce the torque delivered by the motor for particular voltages impressed thereon in substantially inverse proportion to the magnitude of such resistance. However, when a resistance or like means is employed in series with the motor, whether a single or multiple speed machine, a number of disadvantages result as compared to the advantages attained by the employment of the method comprising my invention, as will become evident, to those familiar with the art, as my description proceeds.

It is among the objects of my invention to provide a form of construction of a dynamo electric machine which has all the above named desirable characteristics. To the accomplishment of the foregoing and related ends, said invention, then, consists of the means hereinafter fully described and particularly pointed out in the claim.

The annexed drawing and the following description set forth in detail one mode of carrying out the invention, such disclosed means constituting, however, but one of various forms in which the principle of the invention may be used.

The said annexed drawing is a schematic perspective view of the dynamo electric machine embodying the principles of my invention.

More specifically my invention contemplates the construction of a dynamo electric machine, specifically an induction motor, in which the torque delivered thereby is controlled by relatively skewing the rotor and stator windings of such machines.

By referring to the drawing, it will be noted that I have herein illustrated in schematic form a rotor 1 and stator 2, the stator being provided with low speed windings 3 and high speed windings 4 with the pole pitch of the low speed windings appreciably less than the pole pitch of the high speed windings. The rotor 1 has a plurality of bars generally indicated at 5 which are arranged in angular relation to planes passed through the stator and including the axis thereof, i. e., such bars are skewed relative to the axis of the rotor. The stator 2 is provided with slots generally indicated at 6 in which are positioned the previously described high and low speed windings of the machine.

It is to be understood, as hereinafter more fully explained, that the rotor bars might be positioned parallel to or lying in planes passed through the rotor and including its axis and then the slots in the stator for the windings 3 and 4 skewed a comparable amount.

When a dynamo-electric machine is constructed with the rotor and stator elements without relative skew, all the elemental voltages generated in elemental lengths of the rotor rods will be in phase and consequently the vectorial sum of the elemental voltages, i. e., the voltage induced in the rotor bar, will be a maximum. If, however, the rotor and stator elements are relatively skewed, the elemental voltages generated in the elemental lengths of the rotor bar will be progressively out of phase and consequently the vectorial sum of the elemental voltages, i. e., the induced voltage in the rotor bar, will be less than in the unskewed machine. If the relative skew of the rotor and stator elements were to be extended through two pole pitches of the machine, the vectorial sum of the elemental voltages would be zero. Any relative skewing of the rotor and stator windings which has been resorted to heretofore to accomplish the above named results, has been effected with no appreciation of the torque change effected thereby and consequently the torque change characteristic resulting from such skewing was not utilized as a method of changing the torque of the machine in order to adapt it to suit the torque requirements of the installation for which the machine was designed.

By varying the amount of relative skew of the rotor and stator windings the torque of the machine may be affected to such an extent so that the machine may be made to operate within the relatively narrow limits of the torque value for which such machine has been designed. Accordingly, by the employment of the form of construction comprising my invention, a new and useful result may be obtained which has heretofore only been accomplished by the employment of expensive manufacturing variables, such as the change in the number of rotor conductors, the change of the length of such conductors, and the change in the number of stator conductors. When the number of conductors, both stator and rotor, are relatively few to begin with, naturally the omission or addition of a single winding in either element will produce a corresponding change in the torque far in excess of that which is desired. Consequently, the method comprising my invention enables certain classes of motors to be manufactured with torque characteristics within narrow limits which could never be attained by methods heretofore employed.

A further new and useful result attained by the form of construction comprising my invention results when the same is employed in a so-called multiple speed motor, i. e., a motor which has high and low speed windings. As is well known to those familiar with the art, the pole pitch of a pair of poles of the low speed windings is much less than the pole pitch of a pair of high speed windings in the same machine, such difference varying in accordance with the variation in the speed of the machine attained by the separate windings.

When my invention is employed, if the rotors bars or rotor windings are skewed so as to effect a twenty-five (25) per cent reduction in the torque delivered by the low speed windings, the reduction in the torque delivered by the high speed windings will be a much smaller percentage due to the fact that if the rotor bars are skewed to subtend an angle equal to one-half of the central angle between the poles of the low speed winding, such angle subtended by the skewed rotor windings will be only approximately one-fourth of the central angles between the poles of the high speed windings when such high speed windings have a pole pitch substantially twice the pole pitch of the low speed windings. Accordingly, the proper and desired control may be had over the torque delivered by the motor when operating at low speed without appreciably reducing the efficiency of the motor when operating at high speed.

In the above explanation of the principles comprising my invention, I have only referred to the rotor bars as being skewed, whereas it will be noted that any relative skewing of the rotor windings and the stator windings will effect the same desired result. Consequently, I may prefer, in some specific forms of motor construction, to skew the stator windings relative to the rotor windings so that the same control over the torque of the machine may be had without sacrificing any of the advantages attained by the skewing of the rotor bars. The relative skewing of the rotor and stator windings is the feature in the motor construction which comprises my invention and which is relied upon to produce results never achieved in motor manufacture as heretofore carried out.

Other modes of applying the principle of my invention may be employed instead of the one explained, change being made as regards the mechanism herein disclosed, provided the means stated by the following claim or the equivalent of such stated means be employed.

I therefore particularly point out and distinctly claim as my invention:—

A dynamo-electric machine having relatively rotatable rotor and stator members, said stator having high and low speed windings with the pole pitch of the low speed windings appreciably less than the pole pitch of the high speed windings, windings on said rotor and stator relatively skewed whereby a material change in the low speed torque characteristics is affected without a material change in the high speed torque characteristics of the machine.

Signed by me this 2 day of Sept. 1930.

ERWIN E. DREESE.